United States Patent [19]
Davidson et al.

[11] Patent Number: 5,700,055
[45] Date of Patent: Dec. 23, 1997

[54] SEAT BACK AUTOMATIC HEIGHT ADJUSTOR AND RECLINER MECHANISM

[75] Inventors: Russell K. Davidson, Dearborn; Michael H. J. Heyer; James C. Masters, both of Farmington Hills, all of Mich.

[73] Assignee: Lear Corporation, Southfield, Mich.

[21] Appl. No.: 607,227

[22] Filed: Feb. 26, 1996

[51] Int. Cl.⁶ .................................................. B60N 2/02
[52] U.S. Cl. ............................. 297/378.12; 297/335
[58] Field of Search ........................ 297/378.1, 378.12, 297/353, 331, 335, 337, 284.1, 344.19, 408, 336, 396; 296/65.1

[56] References Cited

U.S. PATENT DOCUMENTS

| | | | |
|---|---|---|---|
| 3,227,488 | 1/1966 | Kosbab et al. | 296/65.1 X |
| 3,554,599 | 1/1971 | Pietschmann | 297/353 |
| 4,181,357 | 1/1980 | Swenson et al. | 297/353 |
| 4,401,343 | 8/1983 | Schmidt | 297/284.1 |
| 4,979,718 | 12/1990 | Bauer et al. | 297/344.19 X |
| 5,195,795 | 3/1993 | Cannera et al. | 297/331 X |
| 5,269,581 | 12/1993 | Odagaki et al. | 296/65.1 X |
| 5,520,440 | 5/1996 | Lee | 297/378.12 |
| 5,527,087 | 6/1996 | Takeda et al. | 297/378.12 X |

FOREIGN PATENT DOCUMENTS

| | | | |
|---|---|---|---|
| 2677601 | 12/1992 | France | 296/65.1 |
| 1049288 | 10/1983 | U.S.S.R. | 296/65.1 |
| 2068216 | 8/1981 | United Kingdom | 297/378.1 |

*Primary Examiner*—Milton Nelson, Jr.
*Attorney, Agent, or Firm*—Howard & Howard

[57] ABSTRACT

A passenger seat assembly (10) for a motor vehicle (12) includes a seat bottom (24) and seat back (26) which can be folded to a horizontal stowed position for increased storage capacity. The seat assembly (10) comprises a linear recliner (66) for adjustment of the seat back (26) in the upright position and to selectively facilitate forward pivotal folding of the seat back (26) to overlap and cover the seat bottom in the stowed position. The seat back (26) also includes a lower portion (150) pivotally attached to a support stanchion (28) and an upper portion (152) connected to the lower portion (150). An adjustment mechanism (154) automatically adjusts the vertical height of the seat back (26) from a retracted position with the upper portion (152) extended upwardly from the lower portion (150).

21 Claims, 8 Drawing Sheets

SEAT BACK AUTOMATIC HEIGHT ADJUSTOR AND RECLINER MECHANISM

TECHNICAL FIELD

The subject invention relates generally to a vehicular seat assembly having a seat bottom and seat back cushion which can be moved from a normal use position to a stowed position, and more particularly, to an improved recliner mechanism for moving the seat back to a plurality of reclined positions and to a fully stowed position.

BACKGROUND OF THE INVENTION

It is becoming increasingly more common for automotive vehicles, and in particular sport/utility and mini-van type vehicles, to include seat assemblies in the rear passenger compartment. Often, these rear seat assemblies are designed to fold or collapse to a horizontal non-use stowed position for increased rear cargo storage capacity. In one such variation as commonly known in the art, the seat cushion portion of the seat assembly is attached to the floor via a hinge assembly adjacent the forward end of the seat bottom so that it folds forwardly to a vertical stowed position. Similarly, the seat back portion of the seat assembly is pivotally attached to the floor so that it folds or pivots to a horizontal stowed position adjacent to the seat bottom, thus forming a flat cargo receiving surface within the vehicle rear compartment area.

The prior art has taught various release latches for unlocking the seat bottom and seat back portions from their normal use position. For example, U.S. Pat. No. 4,124,250 to Weinich, issued Nov. 7, 1978; 3,001,820 to Morphew, issued Sep. 26, 1961 and 5,044,683 to Parsson, issued Sep. 3, 1991 discloses various folding rear seat assemblies and release latches.

SUMMARY OF THE INVENTION

A passenger seat assembly for a motor vehicle which can be folded to a stowed position for increasing cargo storage capacity comprises a seat bottom having an upper surface and a lower surface and a seat back having a front surface and a back surface and pivotal between a generally upright seating position and a generally horizontal folded position. A support stanchion supports the seat bottom and seat back above a vehicle floor. The seat bottom is pivotally coupled to said support stanchion and moveable between a generally horizontal seating position and a folded stowed position with the front surface adjacent the vehicle floor. The seat back is pivotally coupled to the support stanchion and moveable between the upright position and the horizontal folded position wherein the front surface of the seat bottom overlaps and covers the lower surface of the seat bottom in the stowed position and the back surface provides a generally horizontal cargo support surface.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Referring to the Figures, wherein like numerals reference like or corresponding parts throughout the several views, an automotive vehicle seat assembly is generally shown at 10 in the Figures. The seat assembly 10 includes a vehicle 12 having front wheels (not shown) and rear wheels 16. At least two of the wheels are dirigible so that the vehicle 12 can be maneuvered. The vehicle 12 further includes a floor generally indicated at 18. A raised load carrying platform 20 may form a portion of the vehicle floor 18 located over the rear wheels 16 and extending rearwardly therefrom. The floor 18 further includes a forward seating area 22. The forward seating area 22 is forward of the rear wheels 16 and generally lower in height relative to the raised load carrying platform 20. The raised platform 20 and the lower seating area 22 of the vehicle floor 18 are interconnected by a substantially vertical wall. It can be appreciated that the vehicle floor 18 may also be at a continuous level, excluding the raised platform, such as is common in a mini-van type vehicle having a plurality of rows of vehicle seats.

The seat assembly 10 is of the type for placement in the rear area of a passenger compartment in the vehicle 12, and one which can be folded from a generally upright seating position to a generally horizontal stowed position for increasing the cargo capacity in the passenger compartment. The seat assembly 10 may be of any type commonly know in the art, such as a full rear bench seat or the so-called 60/40 split rear bench seat or even a single bucket-type seat.

Figure 1:
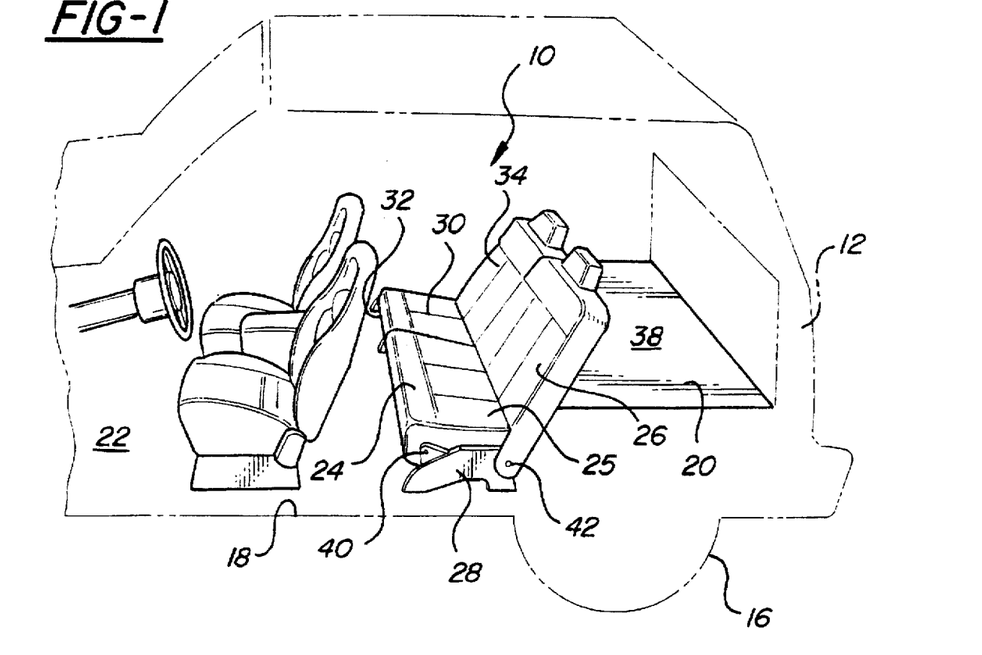
FIG. 1 is a partially broken perspective view of a motor vehicle having front and rear seat assemblies.
Figure 2:
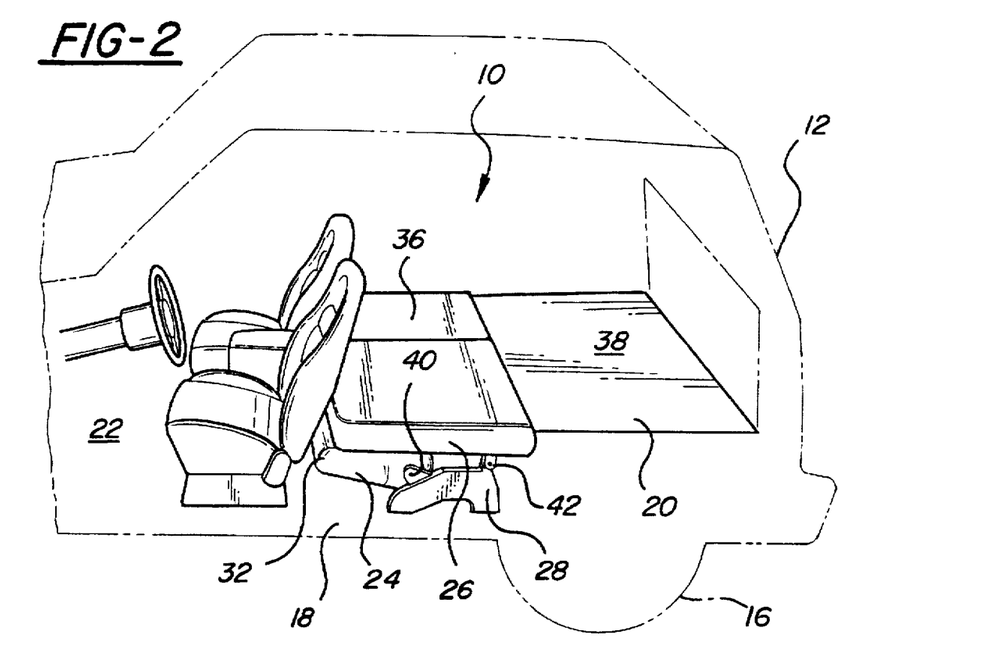
FIG. 2 is a partially broken perspective view of a motor vehicle with the rear seat assembly in a stowed position.

The seat assembly 10 comprises a generally horizontal seat bottom portion 24 upon which an occupant sits, and a generally upright seat back portion 26 pivotal between an upright position, as shown in FIG. 1, and a generally horizontal folded or stowed position, as shown in FIG. 2. The seat bottom 24 is spaced above the vehicle floor 18 by a riser or support stanchion 28 which is fixedly secured to the floor 18 to provide pivotal movement of the seat bottom 24 between a seating position, as shown in FIG. 1, and a generally horizontal folded or stowed position, as shown in FIG. 2.

Each of the seat bottom 24 and seat back 26 include a rigid frame structure usually of tubular metal construction described in further detailed herein below. The seat frame is commonly covered by a resilient contoured foam cushion consisting of polyester or the like and encased in a trim cover typically of upholstered cloth fabric, vinyl or leather.

Figures 3, 4:
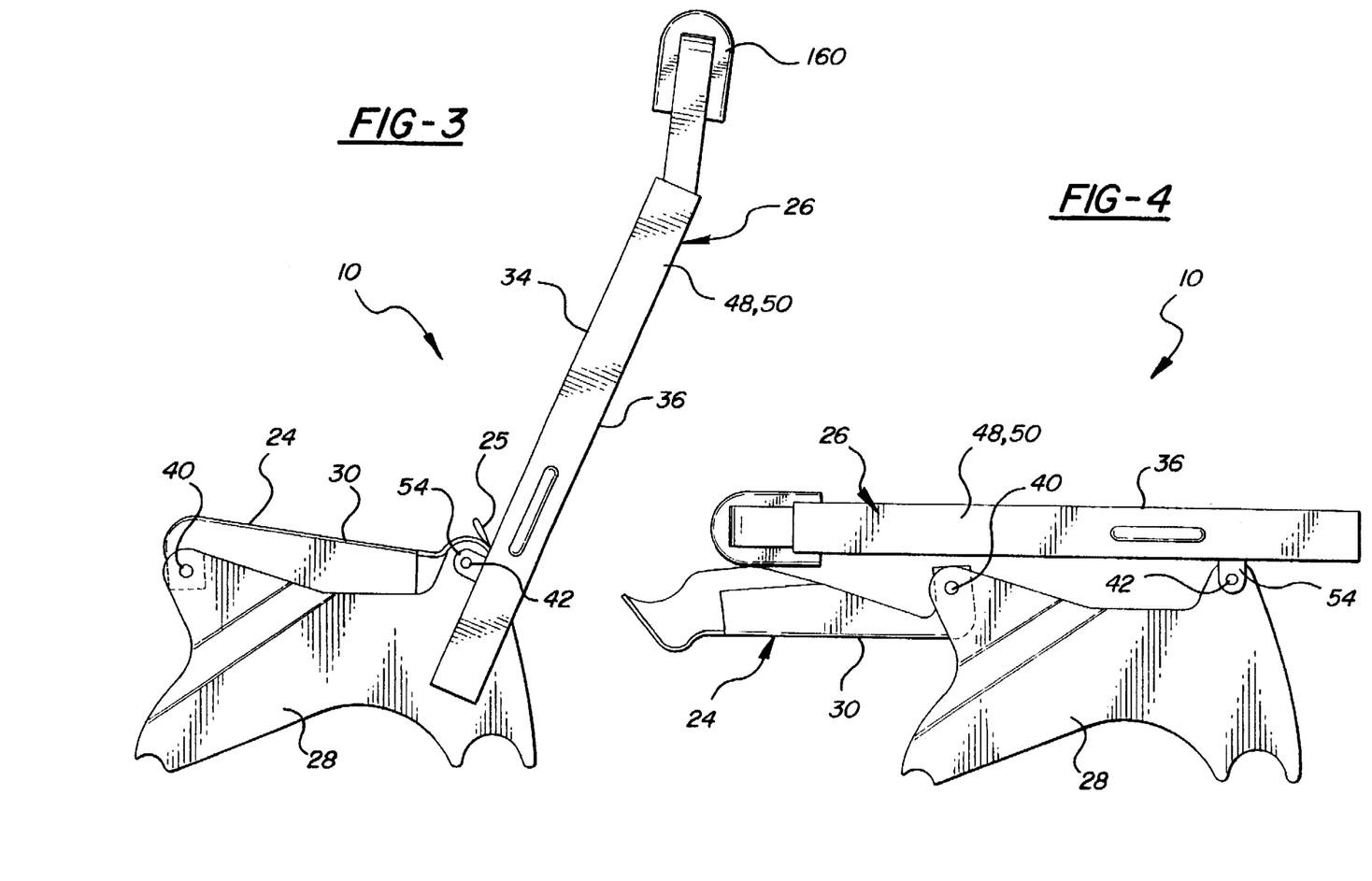
FIG. 3 is a side view of the seat assembly according to the subject invention in an upright seating position.
FIG. 4 is a side view of the seat assembly in a folded stowed position.

Referring to FIGS. 1 through 4, the seat bottom 24 includes an upper surface 30 upon which the occupant sits and a lower surface 32 spaced above and adjacent the vehicle floor 18 when the seat assembly is in the general use or seating position. The seat back 26 includes a front surface 34 for supporting the occupants back and a back surface 36 facing the vehicle rear cargo area 38. The support stanchion 28 includes a front pivot member 40 pivotally coupled to the sides of the forward end of the seat bottom 24 to provide pivotal movement of the seat bottom 24 between the generally horizontal seating position, as shown in FIGS. 1 and 3, and a folded stowed position with the upper surface 30 spaced from and adjacent the vehicle floor 18, as shown in FIGS. 2 and 4. More specifically, the seat bottom 24 pivots approximately 180° about the front pivot 40 and away from the seat back 26 toward the forward seating area 22.

The support stanchion 28 further includes a rear pivot member 42 spaced rearwardly from the front pivot member 40 and pivotally coupled to opposing sides of the lower end of the seat back 26 to provide pivotal movement between the generally upright position, as shown in FIGS. 1 and 3, and the horizontal folded position wherein the front surface 34 of the seat back 26 overlaps and covers the lower surface 32 of the seat bottom 24 in the stowed position and back surface 36 provides a generally horizontal cargo support surface aligned with the load platform 20 or vehicle floor 18. The front surface 34 of the seat back 26 abuts against and completely covers the lower surface 32 of the seat bottom 24 in the folded stowed position.

The seat assembly 10 includes a pair of support stanchions 28 positioned along opposing sides of the seat bottom 24 and seat back 26 and each having symmetric seat inboard 44 and outboard 46 sides. Therefore, only one side of the seat assembly 10 and stanchion 28 will be described in detail.

The seat back 26 comprises a generally U-shaped metal frame having first 48 and second 50 side rails and an upper cross bar member 52 connecting the side rails 48, 50. Each of the side rails 48, 50 include a pivot bracket 54 secured to the lower end for pivotal attachment to the rear pivot member 42 of each respective support stanchion 28. The rear pivot member 40 includes an aperture 56 therethrough aligned with an aperture 58 in the respective pivot bracket 54 for receiving a pivot rod (not shown) therethrough. A cylindrical spacer 60 also having a bore 62 therethrough is positioned between the outboard side 46 of the stanchion 28 and the pivot bracket 54 to space the side rails 48, 50 from the side of the stanchion 28.

The first 48 and second 50 side rails include a C-channel track 64 of general U-shape in cross section extending between the upper and lower ends of the rails 48, 50.

Referring to FIGS. 5 through 9, the seat assembly 10 further includes recliner means 66 interconnecting the seat back 26 and the support stanchion, or support means, 28 for providing pivotal movement of the seat back 26 between the upright position and the folded position. The recliner means 66 includes a linear recliner fixedly secured to the inboard side of the C-channel track 64 by a bracket (not shown). The linear recliner includes a cylinder housing 68 and a sliding piston 70. The piston 70 moves longitudinally within the cylinder housing 68. The piston 70 may be locked in the cylinder by means of a coil spring (not shown) which is coiled around the piston 70 within the housing 68. The linear recliner is readily available from P. L. Porter and commonly referred to as a "Mech Lock" type recliner, which is incorporated herein by reference. A release latch 72 is attached to the support stanchion 28 and connects a push-pull cable control 74 to the ends of the spring which extends through the cylinder housing 68, as shown in FIG. 10, to lock and unlock the piston 70 in the cylinder housing 68. The recliner means 66 further includes a connecting block 76 attached to the distal free end of the piston 70 and slidably received in the C-channel track 64 of the seat back 26. The connecting block 76 comprises a generally square base 78 received in the track 64 and a cylindrical connecting rod 80 extending outwardly from the base 78 beyond the sides of the U-shaped track 64.

Figure 5:
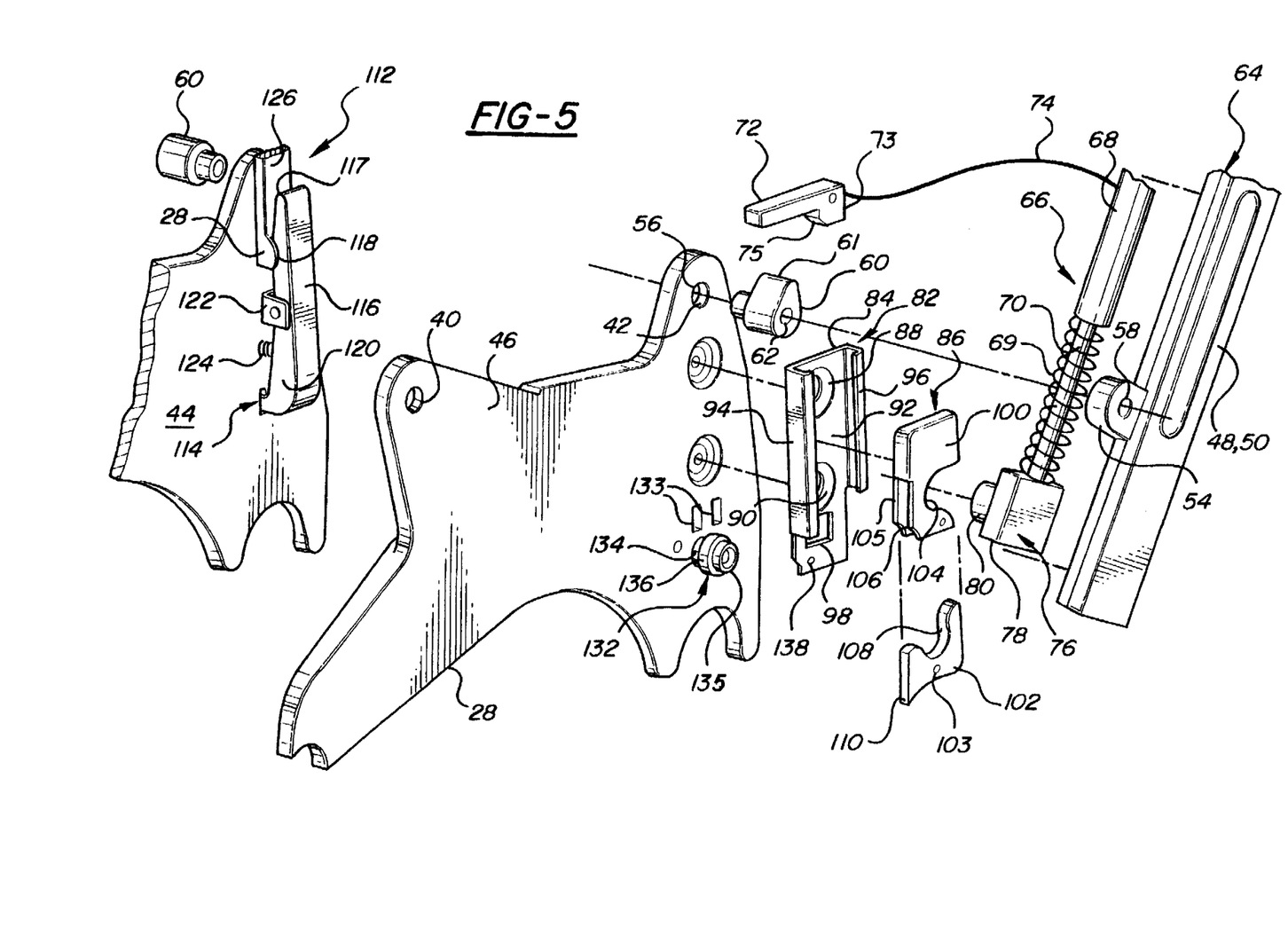
FIG. 5 is an exploded perspective view of the seat assembly stanchion and recliner.

The recliner means 66 further includes a slide mechanism 82 operatively connected to the outboard side 46 of the stanchion 28. The slide mechanism 82 comprises a track member 84 fixed by a pair of bolts or the like to the stanchion 28 and a slide block 86 vertically slidable within the track member 84. Referring to FIG. 5, an exploded view of the recliner 66 is shown. The track member 84 includes a pair of bores 88, 90 for receiving a fastener (not shown) therethrough to attach the track member 84 to the outboard side 46 of the stanchion 28. The track member 84 is positioned below the spacer 60 of the pivot location of the seat back 26 and extends vertically along the stanchion 28. The track member 84 has a generally U-shaped cross-section configuration having a flat surface 92 against the side of the stanchion 28 and first 94 and second 96 side rails extending outwardly from the flat surface 92. The first side rail 94 is slightly longer in vertical length than the second side rail 96. Further, the flat surface 92 has a rectangular opening 98 in the lower portion thereof to expose a portion of the stanchion 28.

The slide block 86 includes a base member 100 and a latch member 102 pivotally attached to the base member 100 at pivot 103 and pivotal between a closed position and an open position. The base member 100 is generally rectangular having a arcuate opening 104 on one side for receiving the connecting rod 80 of the block 76. The base member 100 further includes front and rear spaced apart and parallel plates 105, 106 for pivotally receiving the latch member 102 therebetween. The latch member 102 forms a hook type closure having an arcuate opening 108 opposing the arcuate opening 104 of the base member 100 to create a circular closure around the connecting rod 80. The opposite side of the latch member 102 includes an arcuate lip 110 which will be described in greater detail below. The latch member 102 is pivotal between the closed position for locking the connecting block 76 to the slide block 86 with the seat back 26 in the upright position and releasing the connecting block 76 from the slide block 86 with the seat bottom 24 in the horizontal stowed position and in response to pivotal movement of the seat back 26 to the horizontal folded position.

The connecting block 76 translates the sliding movement of the linear recliner 66 to vertical sliding movement of the slide block 86 within the track member 84.

The seat assembly 10 further includes latch means 112 operatively connected between the seat bottom 24 and the support stanchion 28 for selectively locking the seat bottom 24 in the horizontal use position and the seat back 26 in the upright position. The latch means 112 includes a blocking means 114 for engaging the recliner means 66 with the seat bottom 24 in the horizontal use position to block the pivotal movement of the seat back from the upright position to the horizontal folded position. The blocking means 114 includes a longitudinal lever 116 connected between the latch means 112 and the support stanchion 28 for engaging the recliner 66 when the seat bottom 24 is in the horizontal use position. The lever 116 includes an upper portion forming a camming surface 117 and a detent receiver 118 adjacent the lower surface 32 of the seat bottom 24 and a lower portion having a generally J-shaped configuration 120 facing the inboard side 44 of the stanchion 28. The lever 116 is pivotally coupled to the inboard side 44 of the stanchion 28 between the upper portion and the lower portion by a pivot bracket 122 and pivot rod extending through a bore in the lever 116 and attached to the bracket 122. The lever 116 also includes a coil spring 124 connected between the lower portion of the lever 116 and the inboard side of the stanchion 28 to bias the lower portion away from the stanchion 28 and the upper portion against the stanchion 28.

The latch means 112 includes a detent tab 126 attached to the lower surface 32 of the seat bottom 24 and extending downwardly therefrom. The detent tab 126 has a cam lobe 128 at its distal end to engage the camming surface 117 on the upper portion of the lever 116 and to be received in the detent receiver 118 to selectively lock the seat bottom 24 in the horizontal use position.

The blocking means 114 further includes a pair of parallel spaced apart blocking tabs 130 extending outwardly from the J-shaped lower portion 120 of the lever 116. The stanchion 28 comprises a pair of openings 132, 134 passing from the inboard side 44 to the outboard side 46 of the stanchion 28 for receiving one of the respective blocking tabs 130 therethrough. The blocking tabs 130 extending at least partially past the outboard side 46 of the stanchion 28 when the lower portion of the lever 116 is biased by the spring 124 against the stanchion 28.

The rectangular opening 98 in the track member 84 aligns with the spaced apart openings 132, 134 in the stanchion 28 for receiving the blocking tabs 130 of the lever 116 therethrough when the seat bottom 24 is in the horizontal use position. The blocking tabs 130 extend through the opening 98 and below the slide block 86 to prevent downward sliding movement of the slide block 86 and prevent pivotal movement of the seat back 26 to the horizontal folded position. The blocking means 114 further includes an upper stop which comprises the spacer 60 of the pivoting seat back 26 and a lower stop formed by the tabs 130 spaced below the slide mechanism 82 and defining upper and lower limits of the sliding movement of the slide block 86 in the track member 84. The wheel 132 includes an inner 134 and outer 135 abutment surfaces and a raised center lifting surface 136 to provide an additional stop for the slide block 86.

Figure 6:
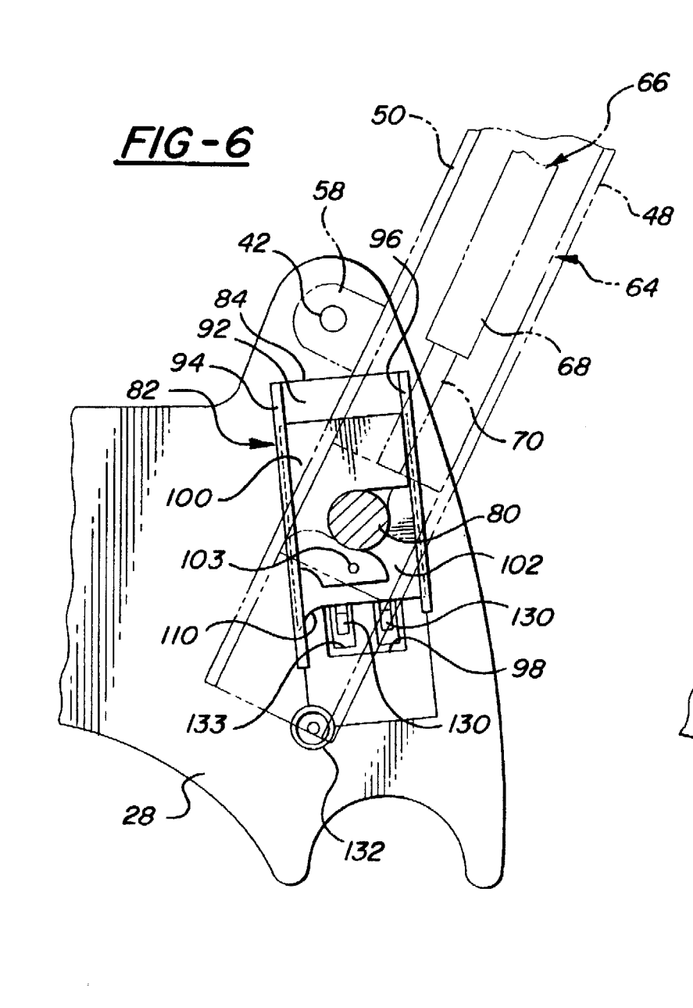
FIG. 6 is a side view of the recliner with the seat back in an upright seating position.

In operation, referring to FIGS. 5 through 9, the seat occupant may recline the seat back 26 by pivotally lifting the release latch 72 to acuate to push-pull cable 74 and unlock the linear recliner 66. The lifting spring 69 urges the piston 70 and connecting block 76 downwardly which inturn forces the slide block 86 to travel downwardly in the track member 84 until the slide block 86 abuts against the blocking tabs 130. The seat back 26 is now in its most upright seating position. With the release latch 72 open, the seat occupant may push rearwardly on the seat back 26 to a reclined position, as shown in FIG. 6. The connecting rod 80 is locked within the arcuate opening 104 of the base member 100 by the latch member 102 and thus the sliding movement of the piston 70 of the linear recliner 66 translates to the vertical sliding movement of the slide block 86 in the track member 84 upwardly until the slide block 86 engages and abuts the upper stop formed by the spacers 60.

When it is desirable to fold the seat assembly to the stowed position, as shown in FIGS. 2 and 4, the seat occupant first lifts the seat bottom 24 by pulling upwardly on a seat strap 25 towards the forward seating area 22. The seat bottom 24 pivots about the front pivot member 40 on the stanchions 28 to release the latch means 112. More specifically, as the seat bottom 24 is pivotally moved, the detent tab 126 is pulled out of engagement from the detent receiver 118 of the lever 116. The spring 124 attached between the lower J-shaped portion 120 of the lever 116 and the inboard side 44 of the stanchion 28 urges the upper portion of the lever 116 towards the stanchion and removes the blocking tabs 130 from the openings 98, 132, and 134. The seat bottom 24 is pivoted forwardly to its horizontal stowed position with the upper surface 30 adjacent the vehicle floor 18.

Figure 7:
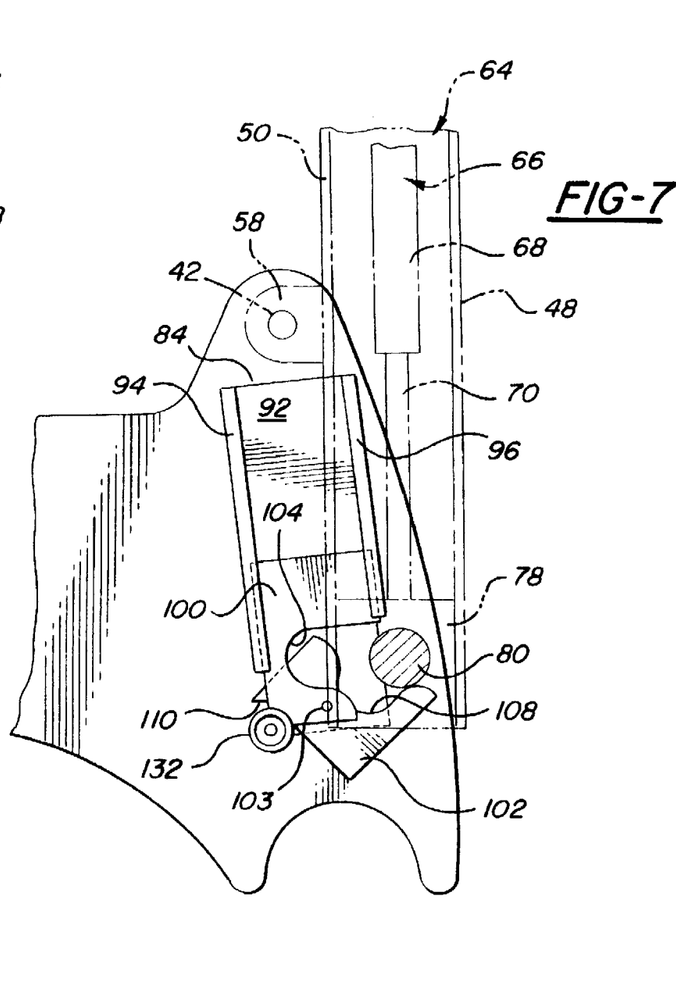
FIG. 7 is a side view of the recliner with the seat back partially folded toward the stowed position.
Figure 8:
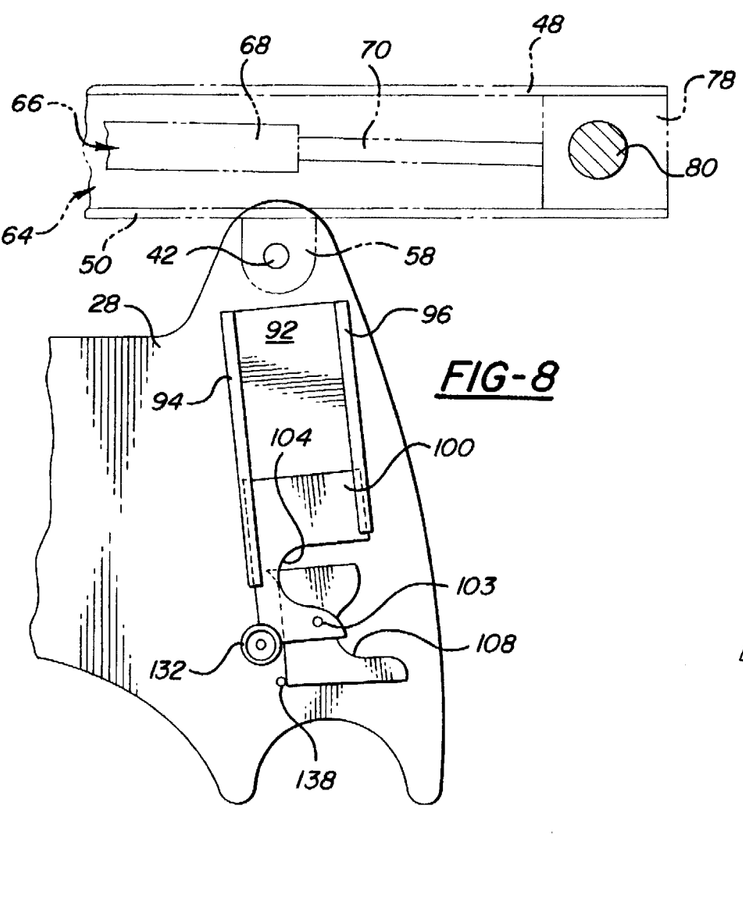
FIG. 8 is a side view of the recliner with the seat back in the fully folded position.

With the blocking tabs 130 removed from the openings 132, 134 in the stanchion 28, and the release latch 72 in the open position, the seat back 26 is free to pivot from the upright seating position forwardly toward the horizontal folded position. As the seat back 26 is folded forwardly, the angle surface 75 of the lifting plate 73 on the release latch 72 rides along the cam lobe 61 of the spacer 60 to maintain the release latch 72 in the open position to allow the piston 70 within the cylinder 68 of the linear recliner 66 to move freely. The connecting rod 80 again forces the slide block 86 to travel downwardly within the track member 84 as the seat back 26 is pivoted forwardly toward the horizontal folded position. The slide block 86 continues downwardly until the spaced apart plates 105, 106 abut against the abutment surfaces 134, 135 on the lower stop 132. As the seat back 26 continues to pivot forwardly, the connecting rod 80 forces the latch member 102 to pivot in a dockwise direction and releasing the connecting rod 80 from the openings 104, 108, as shown in FIG. 7. The seat back 26 is now free to pivot forwardly to the horizontal folded position with the back surface 36 aligned with the rear cargo area 38. As shown in FIG. 8, the latch member 102 is seated in a rest or open position abutting against a latch stop pin 138.

Figure 9:
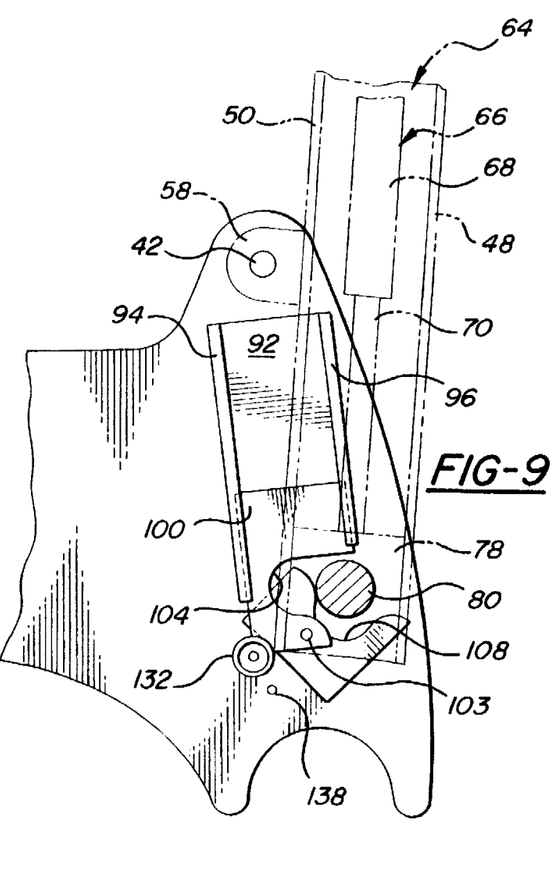
FIG. 9 is a side view of the recliner with the seat back pivoting from the folded position to the upright seating position.
Figure 10:
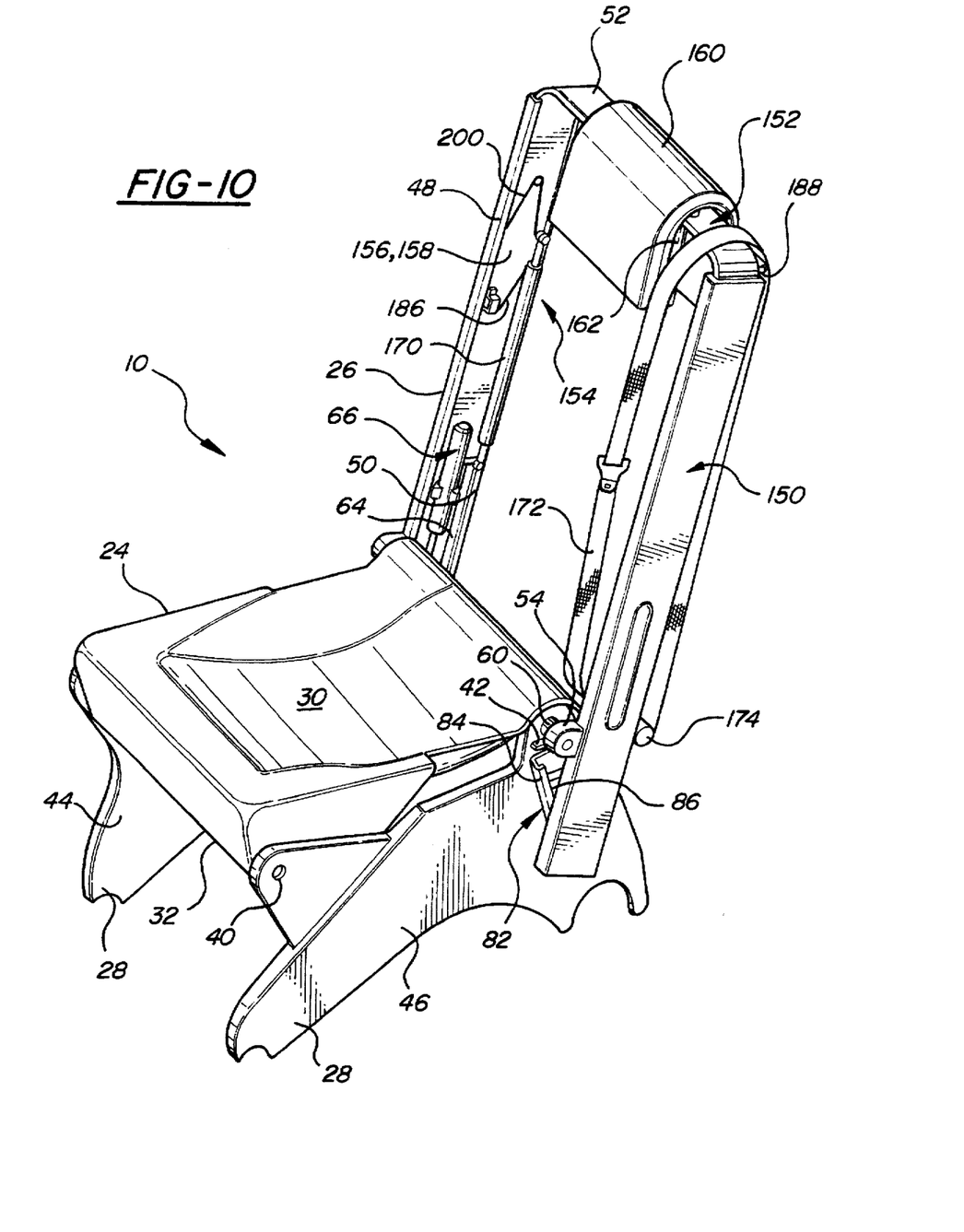
FIG. 10 is a perspective view of the seat assembly according to the subject invention with the upper portion of the seat back retracted into the lower portion.

When the seat back 26 is returned to its upright seating position, the connecting rod 80 engages the surface of the arcuate opening 108 of the latch member 102, as shown in FIG. 9. The latch member 102 continues to pivot about the connecting rod 80 to dose the rod 80 within the arcuate opening 104 of the base member 100. Simultaneously, the arcuate lip 110 of the latch member 102 engages the raised lifting surface 136 of the wheel 132 to urge and assist the slide block 186 to move upwardly within the track member 84. Finally, the seat bottom 24 may be pivoted to its horizontal seating position with the cam lobe 128 of the detent tab contacting the camming surface 117 of the lever 116 against the bias force of the spring 124. With the seat bottom 24 in its locked horizontal use position, the cam lobe 128 is retained in the detent receiver 118 and the lever 116 is pivoted about the pivot bracket 122 to force the blocking tabs 130 through the openings 132, 134 and extend the tabs 130 below the sliding block 86 to prevent or block further forward pivotal movement of the seat back 26 to the folded position.

Figure 11:
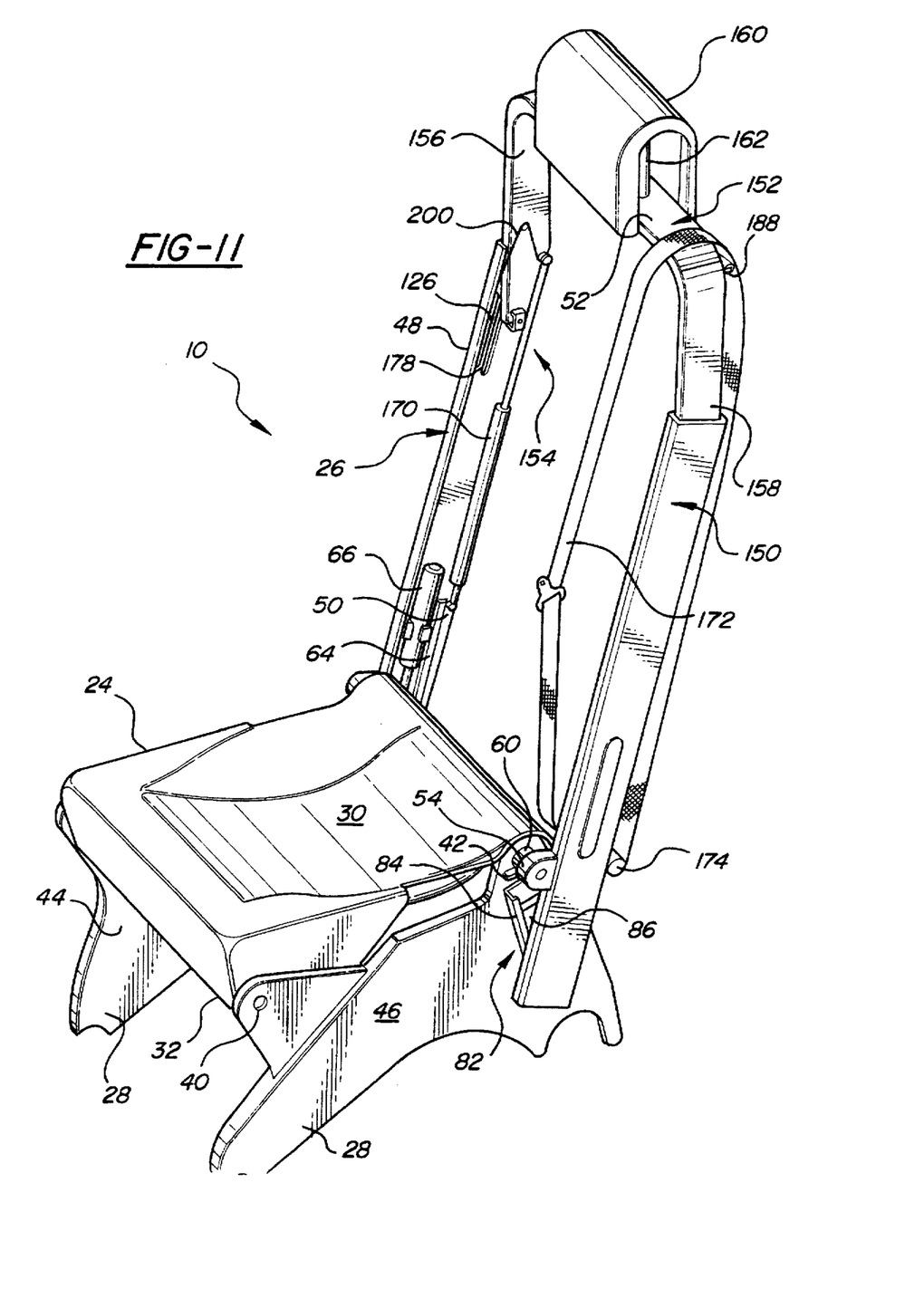
FIG. 11 is a perspective view of the seat assembly with the upper portion of the seat back extended vertically upwardly from the lower portion.

Referring to FIGS. 10 and 11, the seat assembly further includes the seat back 26 having a lower portion 150 adjacent to the seat bottom 24 and an upper portion 152 operatively connected to the lower portion 150. Adjustment means 154 interconnect the upper 152 and lower 150 seat back portions for automatically adjusting the vertical height of the seat back 26 from a retracted position, as shown in FIG. 10, with the upper portion 152 retracted into the lower portion 150 to an extended position, as shown in FIG. 11 with the upper portion 152 extending vertically upwardly from the lower portion 150 of the seat back 26. The lower portion 150 of the seat back 26 comprises the first 48 and second 50 side rails having a C-channel track 64 therein. The upper portion 152 includes first and second extension arms 156, 158 interconnected by the seat back cross bar member 52. The cross bar 52 supports a vertically adjustable headrest 160 which is mounted to the cross bar 52 by a pair of headrest posts 162 which are slidably received through openings in the cross bar member 52. The headrest 160 may be adjusted from a downward position as shown in FIG. 10 to an upward extended position spaced vertically above the cross bar 52.

The seat channel track 64 of the side rails 48, 50 have a generally U-shaped configuration formed by opposing channel walls 164, 166 which are interconnected by an outer plate 168. The extension arms 156, 158 are slidably received within the channel walls 164, 166 of the respective side rails 48, 50.

The adjustment means 154 includes a gas spring 170 interconnected between each of the extension arms 156, 158 and the outer plate 168 of the first 48 and second 50 side rails respectively. The gas spring 170 is commonly available from Industrial Custom Line Gas Spring, Inc. out of Newton Square, Pa. The seat back 26 further includes a seatbelt shoulder harness 172 attached to the lower portion 150 of the seat back frame 26 by seatbelt retractor 174 and extending over the cross bar 52 of the upper portion 152.

Figures 12, 13:
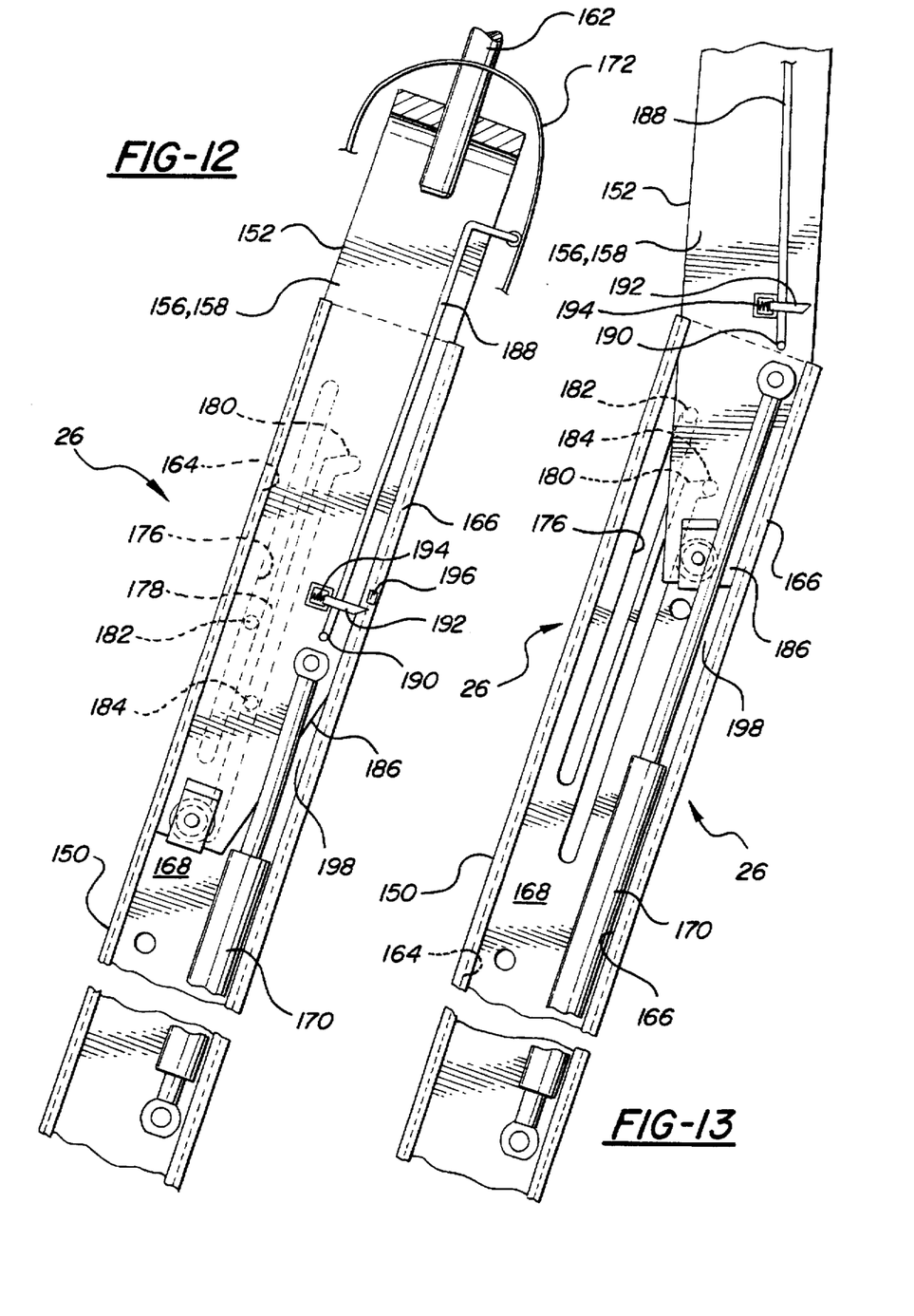
FIG. 12 is a partially broken side view of the adjustment means interconnecting the lower portion and upper portion of the seat back in the retracted position.
FIG. 13 is a partially broken side view of the adjustment means and the pivot means extending the upper portion of the seat back upwardly and forwardly of the lower portion.

Referring to FIGS. 12 and 13, the adjustment means 154 further includes a pair of spaced apart parallel slots extending vertically or longitudinally along the outer plate 168 of the side rails 48, 50. The first slot 176, as shown in FIG. 12, is positioned slightly more toward the cross bar member 52 of the seat back 26 then the second slot 178, i.e. the first and second slots 176, 178 are vertically offset. Further, the second slot includes an angled offset channel extending rearwardly toward the back surface 36 of the seat back 26. The extension arms 156, 158 of the upper portion 152 each include a pair of spaced apart and vertically offset pins 182, 184 received in the first and second slots 176, 178 respectively. Finally, the extension arms 156, 158 include a back rail surface 186 which is angled and spaced away from the rear channel wall 166 of the side rails 58, 50.

In operation, in order to automatically activate and adjust the vertical height of the seat back 26, the seat occupant pulls on the shoulder belt harness 172 in a direction away from the seat back 26. The shoulder belt harness 172 pulls on a lever 188 forwardly or in the counterclockwise direction about a lever pivot 190. An upper portion release latch 192 is attached to the lower portion of the lever 188 and connected to one of the extension arms 156, 158 by a spring 194 and biased in the counterclockwise direction. The release latch 192 engages a locking tab 196 which is attached to one of the side rails 48, 50 of the seat back 26. When the lever 188 is pivoted forwardly by the seatbelt harness 172, the release latch 192 is disengaged from the locking tab 196. The gas springs 170 which are held in compression with the upper portion 152 of the seat back 26 retracted into the lower portion 150 automatically, extend the upper portion 152 of the seat back from the retracted position to the extended position vertically upwardly from the lower portion 150 of the seat back 26.

The extension arms 156, 158 slide vertically within the channel walls 164, 166 while the pins 182, 184 simultaneously slide upwardly within the respective slots 176, 178.

The seat back 26 further includes pivot means 198 for rotating the upper portion 152 forward of the lower portion 150 in response to the adjustment means 154 raising the upper portion 152 from the retracted position to the extended position. The pivot means 198 comprises the angled offset channel 180 of the second slot 178 and the angled rail surface 186 of the extension arms 156, 158. The pivot means 198 further includes a spring as shown at 200 which is interconnected between the extension arms 156, 158 and the channel walls 164, 166 to urge the angled rail surface 186 towards the rear channel wall 166. More specifically, as the pins 182, 184 approach the top end of the slots 176, 178, the spring 200 biases the angled rail surface 186 towards the rear channel wall 166 forcing the pin 184 to continue into the angled offset channel 180 of the second slot 178 and thus pivoting the upper portion 152 of the seat back 26 forwardly of the lower portion 150. This forward angled position of the upper portion 152 closes the distance between the seat occupants head and the headrest assembly 160. When it is desired to lower the seat back height, the occupant simply presses downwardly on the upper portion 152 from the extended position to the retracted position until the release latch 192 engages the locking tab 196 to lock the upper portion 152 within the lower portion 150.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed:

1. A passenger seat assembly for a motor vehicle which can be folded to a stowed position for increasing cargo storage capacity, said assembly comprising:

a seat bottom having an upper surface and a lower surface;

a seat back having a front surface and a back surface and pivotal between a generally upright seating position and a generally horizontal folded position;

a support stanchion for supporting said seat bottom and said seat back above a vehicle floor;

said seat bottom pivotally coupled to said support stanchion and moveable between a generally horizontal seating position and a folded stowed position with said upper surface adjacent the vehicle floor; and said seat back pivotally coupled to said support stanchion and moveable between said upright position and said horizontal folded position wherein said front surface of said seat back overlaps and covers said lower surface of said seat bottom in said stowed position and said back surface providing a generally horizontal cargo support surface.

2. A seat assembly as set forth in claim 1 further characterized by said support stanchion having a front pivot member coupled to said seat bottom and a rear pivot member spaced from said front pivot member and coupled to said seat back.

3. A seat assembly as set forth in claim 2 further characterized by said front surface of said seat back abutting and covering said lower surface of said seat bottom with said seat bottom in said stowed position and said seat back in said horizontal folded position.

4. A passenger seat assembly for a motor vehicle which can be folded to a stored position for increasing cargo storage capacity, said assembly comprising;

a generally horizontal seat bottom having an upper surface and a lower surface;

a generally upright seat back having a front surface and a back surface;

support means for supporting said seat bottom above a vehicle floor movably between a generally horizontal use position and a folded stowed position with said upper surface adjacent the vehicle floor and for supporting said seat back movably between a generally upright position and a generally horizontal folded position overlaying said folded position of said seat bottom;

recliner means interconnecting said seat back and said support means for providing pivotal movement of said seat back between said upright position and said folded position; and latch means operatively connected between said seat bottom and said support means for selectively locking said seat bottom in said horizontal use position and said seat back in said upright position, said latch means including blocking means for engaging said recliner means with said seat bottom in said horizontal use position to block said pivotal movement of said seat back from said upright to said horizontal folded position.

5. A seat assembly as set forth in claim 4 further characterized by said blocking means including a lever operatively connected between said latch means and said support means for engaging said recliner means when said seat bottom is in said horizontal use position.

6. A seat assembly as set forth in claim 5 further characterized by said latch means including a detent tab attached to said seat bottom and a detent receiver attached to said lever.

7. A seat assembly as set forth in claim 6 further characterized by said lever pivotally attached to said support means and including an upper portion forming said detent tab and a lower portion having a generally J-shaped configuration.

8. A seat assembly as set forth in claim 7 further characterized by said blocking means further including a pair of blocking tabs extending outwardly from said J-shaped lower portion of said lever.

9. A seat assembly as set forth in claim 8 further characterized by said support means including a support stanchion adapted to be fixedly secured to the vehicle floor and having a seat inboard side and a seat outboard side; said stanchion further including a front pivot member pivotally coupled to said seat bottom and a rear pivot member pivotally coupled to said seat back.

10. A seat assembly as set forth in claim 9 further characterized by said stanchion including a pair of openings passing from said inboard to said outboard side for receiving said pair of blocking tabs of said lever therethrough.

11. A seat assembly as set forth in claim 10 further characterized by said lever pivotally coupled to said inboard side of said stanchion between said upper portion and said lower portion; said lever including a spring connected between said lower portion of said lever and said inboard side of said stanchion to bias said lower portion away from said stanchion and said upper portion against said stanchion.

12. A seat assembly as set forth in claim 11 further characterized by said recliner means including a linear recliner fixedly secured to said seat back, said linear recliner including a cylinder housing a piston having a distal end and providing linear sliding movement of said piston relative to said cylinder.

13. A seat assembly as set forth in claim 12 further characterized by said recliner means further including a slide mechanism operatively connected to said outboard side of said stanchion, said slide mechanism including a track member fixed to said stanchion and a slide block vertically slidable within said track member.

14. A seat assembly as set forth in claim 13 further characterized by said linear recliner including a connecting block attached to the distal end of said piston and removably coupled to said slide block for translating said linear sliding movement of said piston to vertical sliding movement of said slide block within said track member.

15. A seat assembly as set forth in claim 14 further characterized by said slide block including a base member and a latch member pivotally attached to said base member; said latch member pivotal between a closed position for locking said connecting block to said slide block with said seat back in said upright position and releasing said connecting block from said slide block with said seat bottom in said stowed position and in response to pivotal movement of said seat back to said horizontal folded position.

16. A seat assembly as set forth in claim 15 further characterized by said track member having an opening aligned with said openings in said stanchion for receiving said blocking tabs of said lever therethrough when said seat bottom is in said horizontal use position, said blocking tabs extending through each of said openings below said slide block to prevent sliding movement of said slide block and prevent pivotal movement of said seat back to said horizontal folded position.

17. A seat assembly as set forth in claim 16 further characterized by said recliner means further including an upper stop and a lower stop defining upper and lower limits of said sliding movement of said slide block in said track member.

18. A passenger seat assembly for a motor vehicle comprising:

a generally horizontal seat bottom;

a generally upright seat back;

support means for supporting said seat bottom and said seat back above a vehicle floor;

said seat back including a lower portion adjacent said seat bottom and an upper portion operatively connected to said lower portion;

adjustment means interconnecting said upper and lower seat back portions for automatically adjusting the vertical height of said seat back from a retracted position with said upper portion retracted in said lower portion of said seat back to an extended position with said upper portion extending vertically upwardly from said lower portion of said seat back; and pivot means operatively connected between said upper portion and said lower portion for rotating said upper portion of said seat back forward of said lower portion in response to said adjustment means raising said upper portion from said retracted position to said extended position.

19. A seat assembly as set forth in claim 18 further characterized by said adjustment means including a track member connected to said lower portion of said seat back and a slide member connected to said upper portion of said seat back and slidably received in said track member.

20. A seat assembly as set forth in claim 19 further characterized by said adjustment means including at least one gas spring interconnected between said upper portion and said lower portion of said seat back to automatically extend said upper portion from said retracted position to said extending position.

21. A seat assembly as set forth in claim 20 further characterized by said pivot means including a pair of parallel slots in said track member and a pair of pins in said slide member received in said slots; said slots and said pins being vertically offset and one of said slots having an angled upper channel to receive one of said pins and rotate said upper portion of said seat back to an angle forward of said lower portion.

* * * * *